(12) United States Patent
Igarashi (10) Patent No.: US 10,581,054 B2
(45) Date of Patent: Mar. 3, 2020

(54) BUSBAR STRUCTURE

(71) Applicant: YAZAKI CORPORATION, Tokyo (JP)

(72) Inventor: Suguru Igarashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 100 days.

(21) Appl. No.: 16/000,874

(22) Filed: Jun. 5, 2018

(65) Prior Publication Data

US 2018/0366711 A1  Dec. 20, 2018

(30) Foreign Application Priority Data

Jun. 20, 2017 (JP) ................. 2017-120780

(51) Int. Cl.
| | | |
|---|---|---|
| *H01R 33/00* | (2006.01) | |
| *H01M 2/20* | (2006.01) | |
| *H01M 2/10* | (2006.01) | |
| *H01M 2/30* | (2006.01) | |
| *H01M 2/34* | (2006.01) | |

(52) U.S. Cl.
CPC ......... *H01M 2/204* (2013.01); *H01M 2/1061* (2013.01); *H01M 2/202* (2013.01); *H01M 2/30* (2013.01); *H01M 2/348* (2013.01); *H01M 2/1077* (2013.01); *H01M 2200/103* (2013.01)

(58) Field of Classification Search
CPC ....... H01M 2/204; H01M 2/30; H01M 2/1061
USPC ................................. 439/627, 429
See application file for complete search history.

(56) References Cited

U.S. PATENT DOCUMENTS

| | | | |
|---|---|---|---|
| 4,934,958 A * | 6/1990 | Julian .................... | H01M 2/206 439/504 |
| 6,275,003 B1 * | 8/2001 | Marukawa .......... | H01M 2/0245 320/107 |
| 8,998,646 B2 * | 4/2015 | Okamoto .............. | H01M 2/206 439/627 |
| 9,039,454 B2 * | 5/2015 | Ogasawara ............ | H01R 9/226 439/500 |
| 2006/0160422 A1* | 7/2006 | Bang .................... | H01M 10/425 439/627 |

(Continued)

FOREIGN PATENT DOCUMENTS

| | | |
|---|---|---|
| JP | 2012-74338 A | 4/2012 |
| JP | 2016-66455 A | 4/2016 |
| JP | 2016-91959 A | 5/2016 |

OTHER PUBLICATIONS

Japanese Office Action for the related Japanese Patent Application No. 2017-120780 dated Jul. 23, 2019.

*Primary Examiner* — Abdullah A Riyami
*Assistant Examiner* — Nelson R. Burgos-Guntin
(74) *Attorney, Agent, or Firm* — Kenealy Vaidya LLP (57) ABSTRACT

A busbar structure includes an electrode connection portion that is made of conductive metal and includes a terminal portion and an inter-battery connection portion that has an extended body portion extending from the electrode connection portion and at least one side edge portion of a pair of side edge portions extending from both ends of the extended body portion in a width direction perpendicular to an extending direction of the extended body portion. The at least one side edge portion of the pair of side edge portions is folded onto the extended body portion.

5 Claims, 5 Drawing Sheets

(56) References Cited

U.S. PATENT DOCUMENTS

| | | | | |
|---|---|---|---|---|
| 2008/0305390 A1* | 12/2008 | Naito | .................... | H01M 2/105 |
| | | | | 429/159 |
| 2013/0260611 A1* | 10/2013 | Ahn | .................... | H01M 2/1077 |
| | | | | 439/627 |
| 2014/0087591 A1* | 3/2014 | Ikeda | .................... | H01M 2/206 |
| | | | | 439/627 |
| 2014/0154924 A1* | 6/2014 | Huang | ................... | H01R 13/58 |
| | | | | 439/627 |
| 2015/0064976 A1* | 3/2015 | Da Rocha | .............. | H01R 13/42 |
| | | | | 439/627 |
| 2018/0366711 A1* | 12/2018 | Igarashi | ................ | H01M 2/204 |

\* cited by examiner

BUSBAR STRUCTURE

CROSS REFERENCE TO RELATED APPLICATIONS

This application is based on Japanese Patent Application (No. 2017-120780) filed on Jun. 20, 2017, the contents of which are incorporated herein by reference.

BACKGROUND OF THE INVENTION

1. Field of the Invention

The present invention relates to a busbar structure.

2. Description of the Related Art

In an electric storage device having a plurality of single batteries (unit cells), in the plurality of single batteries arranged in a predetermined shape, one side of positive electrodes and the other side of negative electrodes of the adjacent single batteries are electrically connected in series by a connecting conductor such as a busbar (see JP-A-2012-74338, etc.).

The electric storage device having a plurality of single batteries desirably has a fuse function in the connecting conductor to prevent a current exceeding the rating from flowing to a specific single battery. In this case, it is desirable to reduce the thickness in the fuse shape of the busbar as the connecting conductor to satisfy the fusing characteristic. In addition, it is desirable that the busbar (an inter-battery connection portion) has a thick thickness to prevent the temperature rising when a current is applied.

To realize both the fuse function and the inter-battery connection function by the busbar, the fuse portion and the inter-battery connection portion are provided separately with different thickness. In a battery pack in which a large number of single batteries are connected by the busbar, when the fuse portion and the inter-battery connection portion are separate parts, the number of parts is remarkably increased.

SUMMARY OF THE INVENTION

The invention has been made in view of the above circumstances and the object thereof is to provide a busbar structure capable of having both a fuse function and an inter-battery connection function in a busbar without increasing the number of parts.

The above object according to the invention is achieved by the following configurations.

(1) There is provided a busbar structure including:

an electrode connection portion that is made of conductive metal and includes a terminal portion in which an electrode contact portion to be brought into contact with one electrode of one adjacent single battery is formed at a tip end of a constricted portion; and an inter-battery connection portion that includes:

an extended body portion extending from the electrode connection portion; and at least one side edge portion of a pair of side edge portions extending from both ends of the extended body portion in a width direction perpendicular to an extending direction of the extended body portion, wherein the at least one side edge portion of the pair of side edge portions is folded onto the extended body portion.

According to the busbar structure of the configuration (1) described above, the electrode connection portion having a fuse function is formed with a thin plate material and the inter-battery connection portion can secure a cross-sectional area by folding the extended body portion. In other words, it is possible to have both a fuse function and an inter-battery connection function with one part. Therefore, in a case of the electrode connection portion and the inter-battery connection portion, there is no need to connect two parts. In addition, in a case of the inter-battery connection portion in which the extended body portion is folded, the volume can be secured at the folded portion, and thus it is possible to prevent the temperature rising. Furthermore, in the case of the inter-battery connection portion in which the extended body portion is folded, the surface area is also large, and thus the amount of heat radiation can also be increased.

(2) For example, both side edge portions of the pair of side edge portions are folded onto the extended body portion.

According to the busbar structure of the configuration (2) described above, it is easier to increase the material utilization rate (yield) of the developed shape of the electrode connection portion and the inter-battery connection portion, as compared with the case where only one side edge portion is folded. When both side edge portions extending from the both ends of the extended body portion in the width direction perpendicular to the extending direction of the extended body portion are folded onto the extended body portion, the folded mating portion can be formed to have a zigzag shape. The outline of the developed shape can be made smaller by allowing the folded mating portion to have a zigzag shape as compared with a case where a portion having substantially the same shape as the extended body portion is folded. As a result, in the busbar structure, the yield can be improved.

(3) For example, the busbar structure further includes an electrode connection plate that is comprised of conductive metal, is conductively connected to an extended tip end of the inter-battery connection portion, and includes a terminal portion in which an electrode contact portion to be brought into contact with the other electrode of the other adjacent single battery is formed at a tip end of a constricted portion, wherein the inter-battery connection portion extends with inclination from the electrode connection portion which is connected to one electrodes of the plurality of adjacent single batteries toward the electrode connection plate which is connected to the other electrodes, the plurality of single batteries being formed in a columnar shape in which axes are directed to the same direction and one electrodes and the other electrodes are directed to the same direction.

Also, for example, the extended body portion and the at least one side edge portion are formed in a single conductive plate.

According to the busbar structure of the configuration (3) described above, the inter-battery connection portion extends with inclination from the electrode connection portion which connects one electrodes of a plurality of adjacent single batteries to the electrode connection plate which connects the other electrodes. In other words, since the inter-battery connection portion is inclined, it is possible to electrically connect one electrodes and the other electrodes of a plurality of adjacent single batteries of which the electrodes are oriented in the same direction. As a result, it is not necessary to arrange the plurality of single batteries such that the positive electrodes and the negative electrodes to be placed in different directions, and it is possible to achieve the alignment where the same polarity is directed in the same direction. Thus, it is possible to improve the assemblability of the plurality of single batteries.

According to the busbar structure of the invention, it is possible to have both the fuse function and the inter-battery connection function in the busbar without increasing the number of parts.

Hereinbefore, the invention is briefly described. The details of the invention will be further clarified by reading through a mode for carrying out the invention (hereinafter referred to as an "embodiment") described below with reference to the accompanying drawings.

DETAILED DESCRIPTION OF THE EXEMPLARY EMBODIMENTS

Hereinafter, an embodiment of the invention will be described with reference to the drawings.

Figure 1:
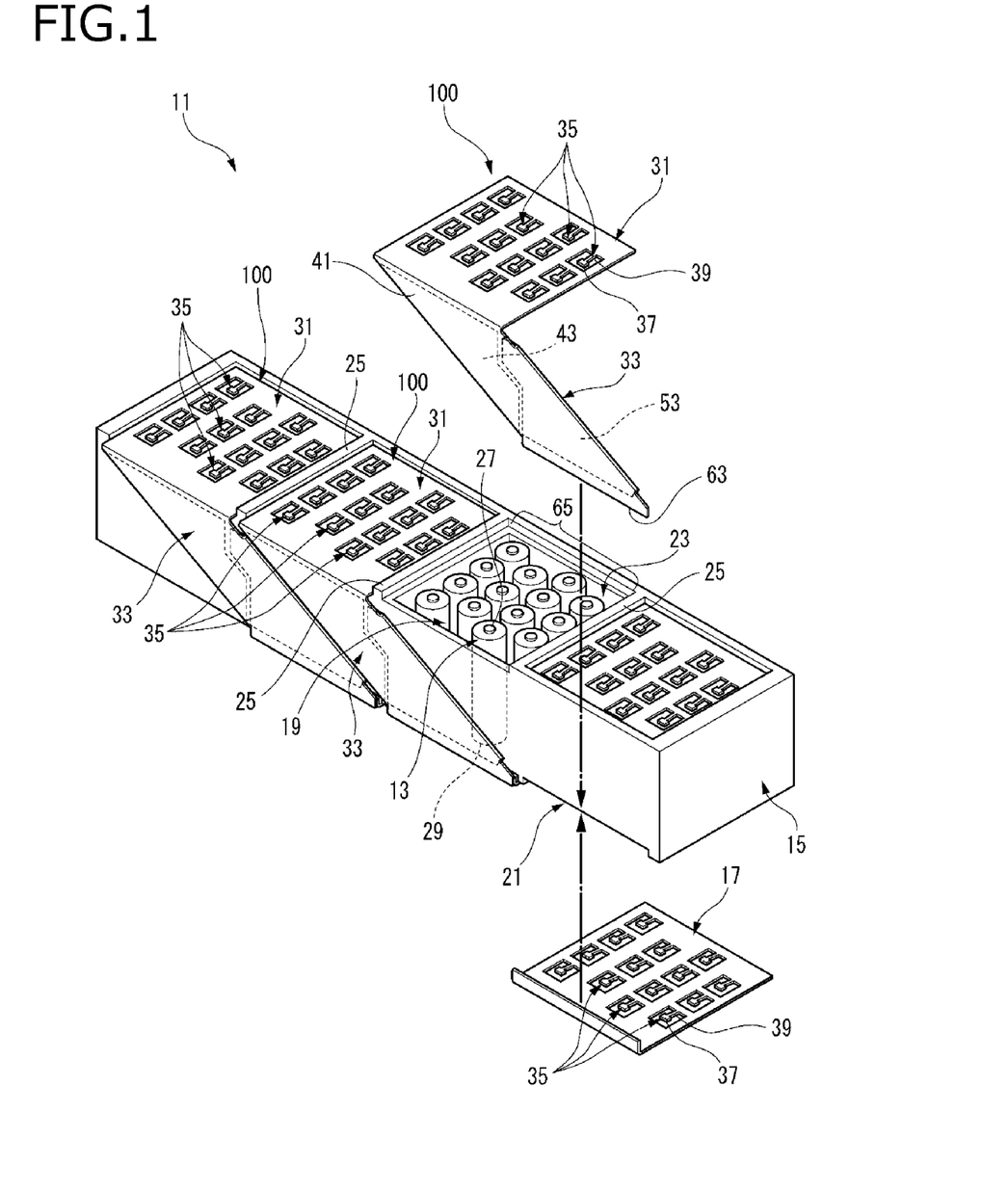
FIG. 1 is an exploded perspective view of a battery pack having a busbar structure according to an embodiment of the invention.

FIG. 1 is an exploded perspective view of a battery pack 11 having a busbar structure according to the embodiment of the invention.

The busbar structure according to the embodiment is suitable for use in the battery pack 11 which has a plurality of single batteries 13.

As illustrated in FIG. 1, the battery pack 11 includes a case 15, a plurality of single batteries 13 which is accommodated in the case 15, busbars 100, and electrode connection plates 17.

The case 15 is formed in a rectangular parallelepiped box shape of which an upper surface and a lower surface are open. The case 15 can be made of, for example, insulating resin. In the case 15, the upper surface and one side surface forms a busbar arrangement space 19 where a busbar 100 is arranged. In addition, in the case 15, a lower surface forms a connection plate arrangement space 21 in which the electrode connection plate 17 is arranged. In the busbar arrangement space 19, a plurality of busbars 100 are attached side by side in the longitudinal direction of the case 15. In the embodiment, four busbars 100 are attached, but the number thereof is not limited to four. Further, in the connection plate arrangement space 21, a plurality of electrode connection plates 17 are attached side by side in the longitudinal direction of the case 15. In the embodiment, four electrode connection plates 17 are attached, but the number thereof is not limited to four.

The respective busbar 100 and the electrode connection plate 17 are attached to the case 15, and then those are connected together, for example, by welding. That is, the busbar 100 and the electrode connection plate 17 are in a conductive state.

In the case 15, a plurality of single battery accommodation chambers 23 in which a plurality of single batteries 13 are accommodated are partitioned by partition walls 25. In the embodiment, fourteen single batteries 13 are accommodated in each of four single battery accommodation chambers 23, but the number of the single battery accommodation chambers 23 and the single batteries 13 is not limited thereto.

The single battery 13 is formed in a cylindrical shape. Further, one side thereof in a direction along the axis is a positive electrode 27 and the other is a negative electrode 29. The single batteries 13 in each single battery accommodation chamber 23 are arranged in 4 rows. The single batteries 13 of the respective rows are arranged from the left side in FIG. 1 by four in the first row, three in the second row, four in the third row, and three in the fourth row. The arrangement of the single battery 13 is not limited thereto. The single batteries 13 of the respective single battery accommodation chambers 23 are accommodated such that the axes are in the same direction and one electrodes and the other electrodes are directed in the same direction. In the embodiment the entirety of the single batteries 13 accommodated in the case 15 are accommodated in a state where the positive electrodes 27 are directed to the upper side of FIG. 1.

Figure 2:
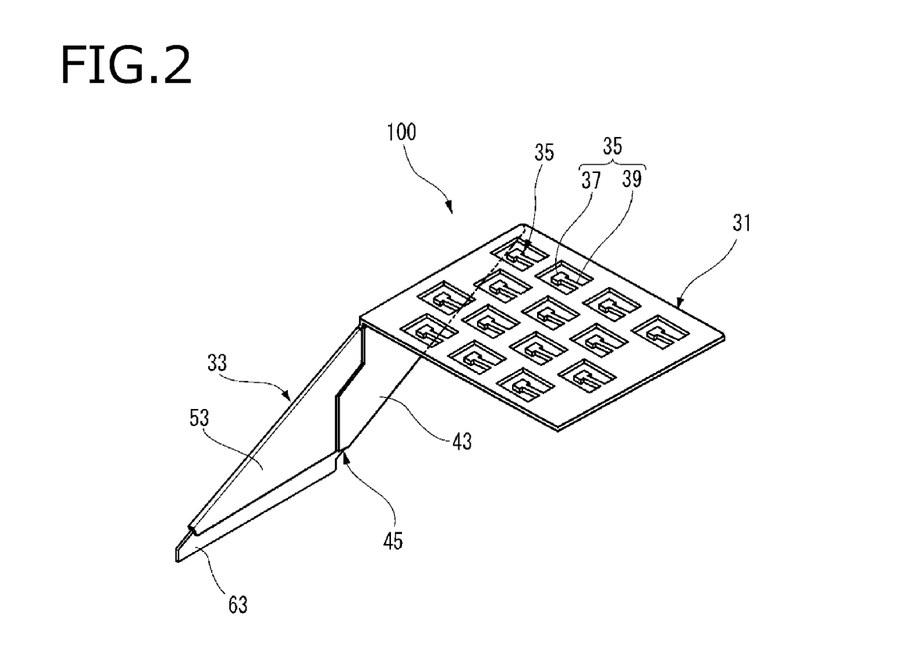
FIG. 2 is a perspective view of the busbar illustrated in FIG. 1.

FIG. 2 is a perspective view of the busbar 100 illustrated in FIG. 1.

The busbar 100 according to the present embodiment mainly has an electrode connection portion 31 for electrically connecting the positive electrodes 27 of a plurality of single batteries 13 and an inter-battery connection portion 33.

The electrode connection portion 31 is formed in a substantially square plate shape with a conductive metal plate. In the electrode connection portion 31, a plurality of terminal portions 35 are formed in four rows. Respective terminal portions 35 are formed integrally with the electrode connection portion 31 as a resilient flexible piece by punching the plate-shaped electrode connection portion 31 around the respective terminal portions 35. The terminal portions 35 of the respective rows correspond to the array of the plurality of single batteries 13 accommodated in the case 15 and, from the left side of FIG. 1, four in the first row, three in the second row, four in the third row, and three in the fourth row are provided.

In each terminal portion 35, an electrode contact portion 37 is formed at the tip end of a constricted portion 39 so as to be brought into contact with an electrode (the positive electrode 27 in the embodiment) of the single battery 13. The electrode contact portion 37 is electrically joined to the electrode of the single battery 13 by welding. In the terminal portion 35, a portion between the electrode contact portion 37 of the tip end has a small cross-sectional area by the constricted portion 39. In the terminal portion 35, the constricted portion 39 is a fusible portion (a fuse portion) which is melted when a current exceeding the rating flows. In the constricted portion 39, when an overcurrent flows, the current density increases, and thus the Joule calorific value increases as compared with other portions and it tends to melt easily. In other words, the electrode connection portion 31 having the terminal portion 35 has a fuse function. The electrode connection portion 31 is configured so that each terminal portion 35 has the constricted portion 39, and thus it is possible to prevent a current exceeding the rating from flowing to a specific single battery 13.

A thin metal plate is used as the electrode connection portion 31 to satisfy the fusing characteristic of the constricted portion 39. The electrode connection portion 31 is integrally formed by performing press molding on a conductive metal plate made of copper (Cu), aluminum (Al), or the like as a base material.

In the electrode connection portion 31, the width of the constricted portion 39 is narrowed so as to facilitate melting based on a predetermined fusing characteristic. The terminal portion 35 can change the rated current capacity by changing at least the conductive width of the constricted portion 39.

As a result, the electrode connection portion 31 can be changed to an appropriate fuse characteristic (the rated current capacity) in accordance with each of single batteries 13 having different specifications while the same outer shape is maintained. That is, the electrode connection portion 31 has no change in the external size.

In the inter-battery connection portion 33, an extended body portion 41 (see FIG. 3) extends from the electrode connection portion 31. That is, the inter-battery connection portion 33 is integrally formed by press molding with the same conductive metal plate as the electrode connection portion 31. In the inter-battery connection portion 33, at least one side edge portion of a pair of side edge portions extending from both ends of the extended body portion 41 in a width direction perpendicular to an extending direction of the extended body portion 41 is folded onto the extended body portion 41.

Figure 3:
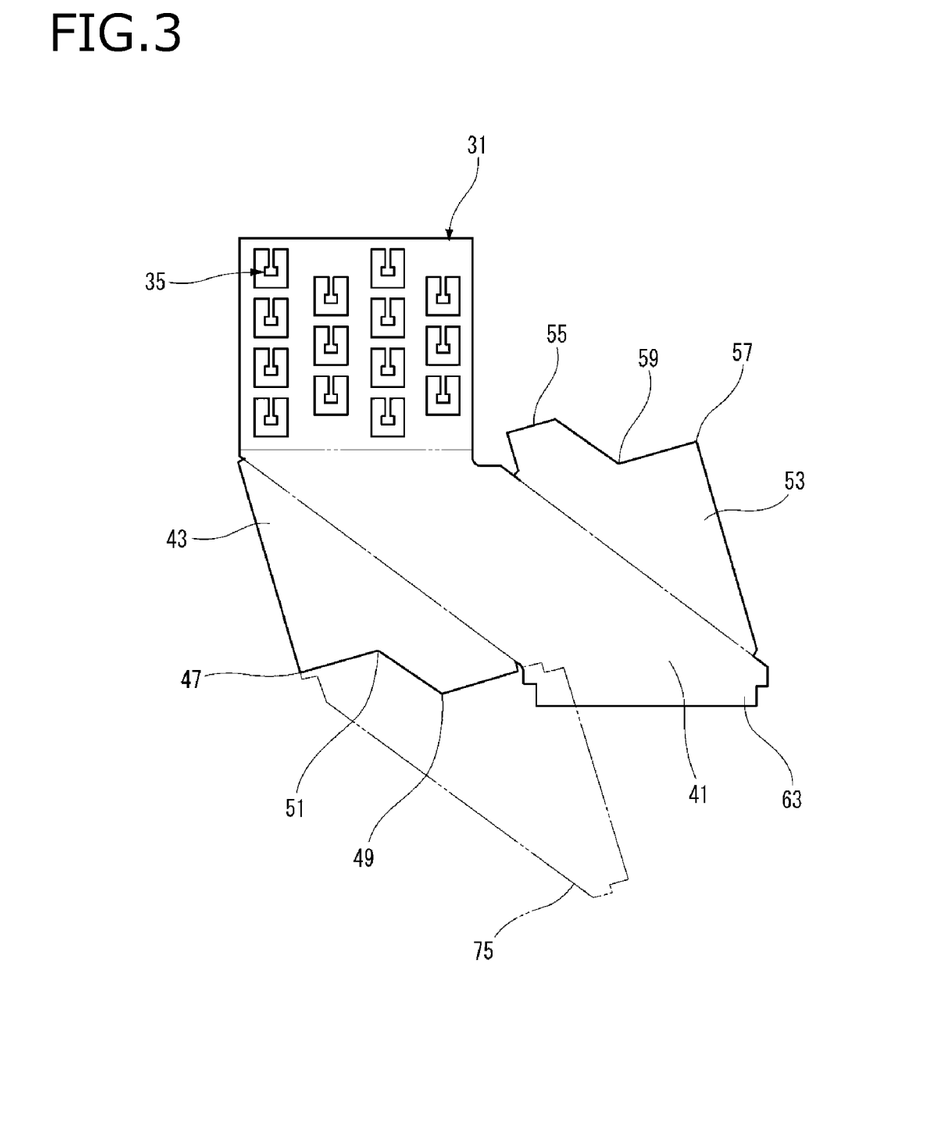
FIG. 3 is a developed view of the busbar illustrated in FIG. 2 before a folding process is performed.

FIG. 3 is a developed view of the busbar 100 illustrated in FIG. 2 before a folding process is performed.

In the embodiment, in the inter-battery connection portion 33, side edge portions extending from both ends of the extended body portion 41 in the width direction perpendicular to the extending direction of the extended body portion 41 are folded onto the extended body portion 41. In the inter-battery connection portion 33, the thickness is doubled by hemming to fold the conductive metal plate (a plate material) of a small thickness from both sides by 180 degrees.

In one side edge portion 43 to be hemmed, a mating portion 45 (see FIG. 2) at the time of folding is formed by a first peak portion 47, a second peak portion 49, a first valley portion 51 therebetween. In the other side edge portion 53, the mating portion 45 at the time of folding is formed by a first trapezoidal portion 55, a third peak portion 57, and a second valley portion 59 therebetween.

Figure 4A:
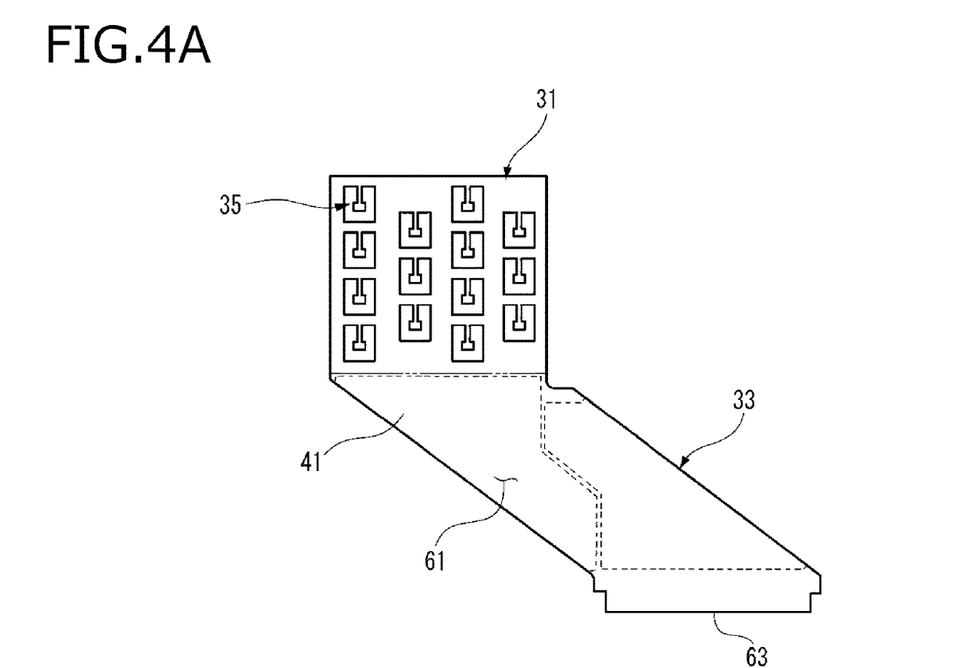
FIG. 4A is a plan view of the busbar in which an inter-battery connection portion is hemmed and FIG. 4B is a rear view of the busbar in which the inter-battery connection portion is hemmed.
Figure 4B:
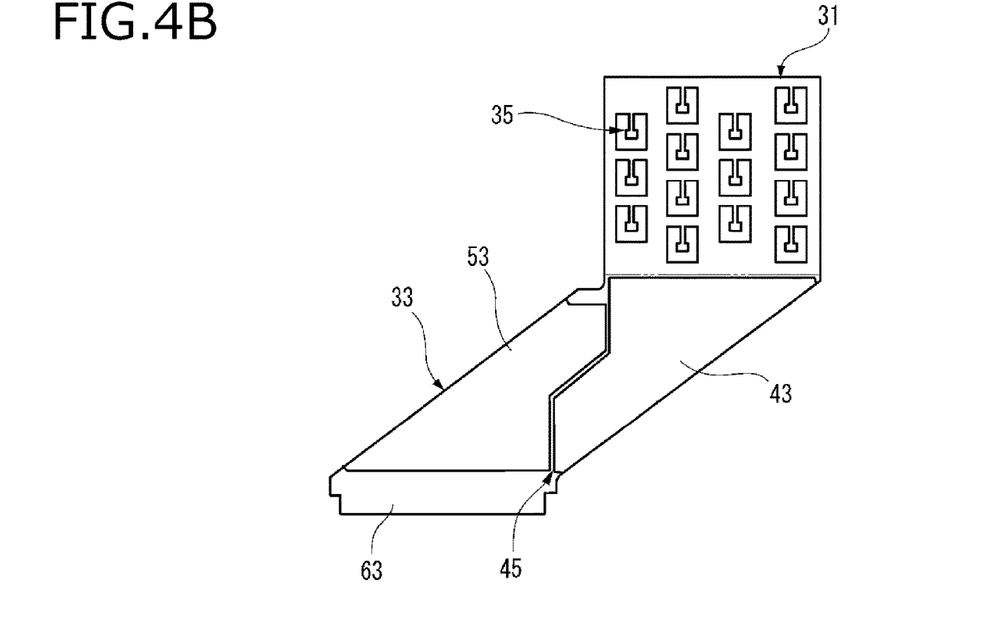

FIG. 4A is a plan view of the busbar in which an inter-battery connection portion 33 is hemmed and FIG. 4B is a rear view of the busbar in which the inter-battery connection portion 33 is hemmed.

In the inter-battery connection portion 33, a surface opposite to the surface facing the case 15 is a flat surface 61 illustrated in FIG. 4A. In the inter-battery connection portion 33, the mating portion 45 where the first valley portion 51 is fitted to the first trapezoidal portion 55 and the second peak portion 49 is fitted to the second valley portion 59 is formed in a surface facing the case 15. In the inter-battery connection portion 33, one side edge portion 43 and the other side edge portion 53 are folded onto the extended body portion 41, so that the mating portion 45 has a zigzag shape.

In the case where the busbar 100 is formed by blanking a plate material, the outer shape of the material can be reduced by making the mating portion 45 to have a zigzag shape described above. The outer shape is reduced, in such a manner that it is possible to reduce the scrap part of the material by densifying the blank array (the blank layout). That is, the material utilization rate (yield) can be increased.

In the busbar structure according to the present embodiment, the electrode connection plate 17 is conductively connected to an extended tip end 63 of the inter-battery connection portion 33. The electrode connection plate 17 is formed in substantially the same shape as the electrode connection portion 31 of the busbar 100. In other words, the electrode connection plate 17 for electrically connecting the negative electrodes 29 of the plurality of single batteries 13 has a terminal portion 35 in which an electrode contact portion 37 which is brought into contact with the other electrode (the negative electrode 29 in the embodiment) of the other adjacent single battery 13 is formed at the tip end of the constricted portion 39.

In the busbar structure of the present embodiment, the inter-battery connection portion 33 is bent at right angles to the electrode connection portion 31 as illustrated in FIGS. 1 and 2, and thus the inter-battery connection portion 33 extends with inclination from the electrode connection portion 31 which is connected to one electrodes (the positive electrodes 27) of the plurality of adjacent single batteries 13 toward the electrode connection plate 17 which is connected to the other electrodes (the negative electrodes 29).

By attaching four busbars 100, the battery pack 11 electrically connects the positive electrodes 27 of fourteen single batteries 13 accommodated in each single battery accommodation chamber 23 in parallel. In the battery pack 11, the four electrode connection plates 17 are attached, so that the negative electrodes 29 of the fourteen single batteries 13 accommodated in each single battery accommodation chamber 23 are electrically connected in parallel. In the battery pack 11, the inter-battery connection portion 33 of the busbar 100 is inclined and conducts to the electrode connection plate 17 of the adjacent single battery accommodation chamber 23. As a result, the battery pack 11 is configured such that four battery packs 65 each of which is constituted of fourteen single batteries 13 connected in parallel are connected in series.

Next, the operation of the configuration described above will be described.

In the busbar structure according to the embodiment, the electrode connection portion 31 has a terminal portion 35 in which the electrode contact portion 37 is formed at the tip end of the constricted portion 39. The constricted portion 39 has a fuse function to be melted when a current exceeding the rating flows in the electrode contact portion 37. Therefore, the electrode connection portion 31 is formed of a thin plate material. On the contrary, in the inter-battery connection portion 33, both side edge portions of the extended body portion 41 extending from the both ends of the electrode connection portion 31 are folded in the extended body portion 41. These side edge portions overlap the extended body portion 41 by hemming (folding). Therefore, the inter-battery connection portion 33 has a plate thickness twice than that of the electrode connection portion 31. Therefore, the electrode connection portion 31 and the inter-battery connection portion 33 can be formed of a single conductive metal plate while those have different thicknesses.

As described above, in the busbar structure according to the embodiment, the electrode connection portion 31 having a fuse function is formed of a thin plate material and the inter-battery connection portion 33 is formed by folding the extended body portion 41 to secure the cross-sectional area. That is, it is possible to achieve both a fuse function and an inter-battery connection function with one part.

Figure 5:
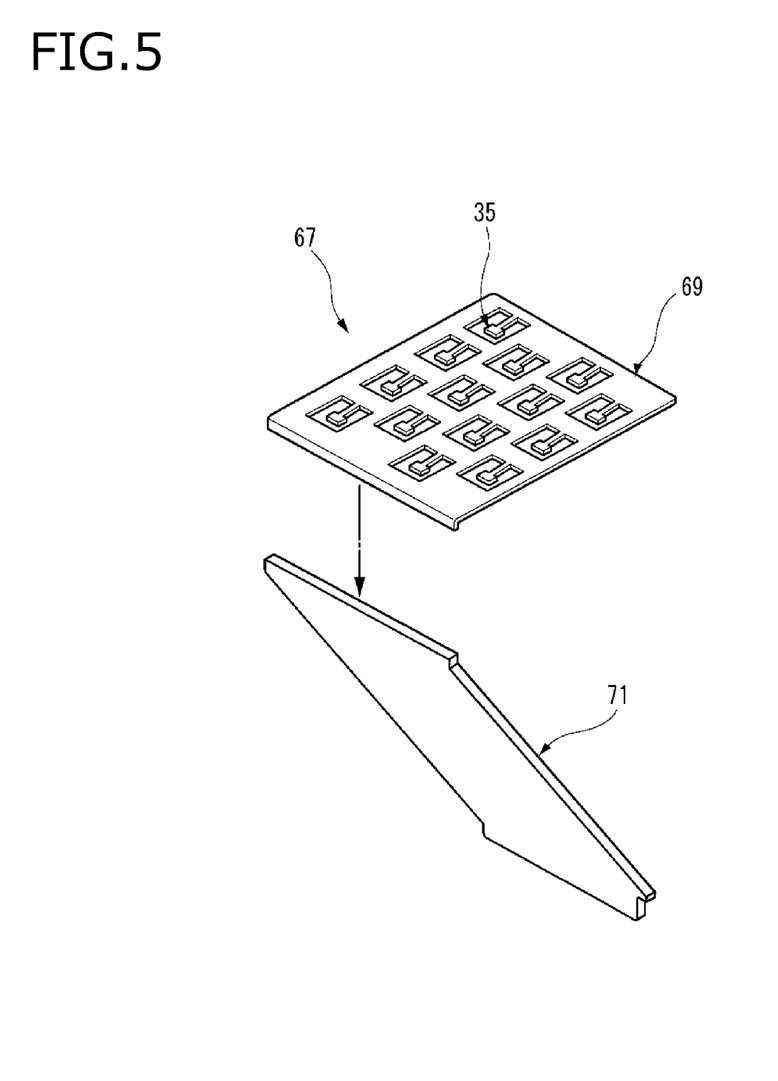
FIG. 5 is a perspective view of a busbar according to a comparative example.

Therefore, in a case of the electrode connection portion 31 and the inter-battery connection portion 33 according to the embodiment, it is not necessary to connect two parts in which an electrode contact portion 69 and an inter-battery connection portion 71 are formed separately with different thicknesses by welding or the like, such as the busbar 67 according to the comparative example illustrated in FIG. 5, for example.

Further, in the busbar structure of the present embodiment, the inter-battery connection portion 33 in which the extended body portion 41 is folded can secure a volume at the folded portion. As a result, the inter-battery connection portion 33 can prevent the temperature rising. Furthermore, since the inter-battery connection portion 33 in which the extended body portion 41 is folded has a large surface area, the amount of heat radiation can also be increased.

Further, in the busbar structure of the present embodiment, it is easier to increase the material utilization rate (yield) of the developed shape of the electrode connection portion 31 and the inter-battery connection portion 33, as compared with the case where only one side edge portion is folded. When both side edge portions in the extending direction of the extended body portion 41 are folded onto the extended body portion 41, the folded mating portion 45 can have a zigzag shape. The outline of the developed shape can be made smaller by allowing the folded mating portion 45 to have a zigzag shape as compared with a case where a single-side folded portion 75 (see FIG. 3) having substantially the same shape as the extended body portion 41 is folded. As a result, in the busbar structure of the embodiment, the yield can be improved.

In the busbar structure of the present embodiment, the inter-battery connection portion 33 extends with inclination from the electrode connection portion 31 which connects one electrodes (the positive electrodes 27) of a plurality of adjacent single batteries 13 to the electrode connection plate 17 which connects the other electrodes (the negative electrodes 29). In other words, since the inter-battery connection portion 33 is inclined, it is possible to electrically connect the positive electrodes 27 and the negative electrodes 29 of a plurality of adjacent single batteries 13 of which the electrodes are oriented in the same direction. As a result, according to the battery pack 11 using the busbar structure of the present embodiment, it is not necessary to arrange the single batteries 13 such that the positive electrodes 27 and the negative electrodes 29 are placed in different directions, and it is possible to achieve the alignment where the same polarity is directed in the same direction. Thus, it is possible to improve the assemblability of the plurality of single batteries 13.

Therefore, according to the busbar structure of this embodiment, it is possible to have both the fuse function and the inter-battery connection function in the busbar 100 without increasing the number of parts.

The invention is not limited to the embodiment described above. It is a plan of the invention to combine the configurations of the embodiment with each other or to modify and apply the embodiment by those skilled in the art based on the description of the specification and well-known techniques. Also, it is included in the scope to be protected.

For example, in the configuration example described above, the electrode connection plate 17 is provided separately from the busbar 100. However, in the busbar structure according to the invention, the busbar 100 and the electrode connection plate 17 may be integrally formed.

Here, the features of the embodiment of the busbar structure according to the invention described above are summarized briefly in the following [1] to [3], respectively.

[1] A busbar structure including:
an electrode connection portion (31) which is made of conductive metal and includes a terminal portion (35) in which an electrode contact portion (37) to be brought into contact with one electrode (a positive electrode 27) of one adjacent single battery (13) is formed at a tip end of a constricted portion (39); and
an inter-battery connection portion (33) that includes:
an extended body portion (41) extending from the electrode connection portion (31); and
at least one side edge portion of a pair of side edge portions (43, 53) extending from both ends of the extended body portion in a width direction perpendicular to an extending direction of the extended body portion (41),
wherein the at least one side edge portion of the pair of side edge portions (43,53) is folded onto the extended body portion (41).

[2] The busbar structure according to [1], wherein both the side edge portions (43, 53) of the pair of side edge portions are folded onto the extended body portion (41).

[3] The busbar structure according to [1] or [2], further including:
an electrode connection plate (17) which is made of conductive metal, is conductively connected to an extended tip end (63) of the inter-battery connection portion (33), and includes a terminal portion (35) in which an electrode contact portion (37) to be brought into contact with the other electrode (a negative electrode 29) of the other adjacent single battery (13) is formed at a tip end of a constricted portion (39), wherein
the inter-battery connection portion (33) extends with inclination from the electrode connection portion (31) which is connected to one electrodes (the positive electrodes 27) of the plurality of adjacent single batteries (13) toward the electrode connection plate (17) which is connected to the other electrodes (the negative electrodes 29), the plurality of single batteries being formed in a columnar shape in which axes are directed to the same direction and one electrodes (the positive electrodes 27) and the other electrodes (the negative electrodes 29) are directed to the same direction.

[4] The busbar structure according to any one of [1] to [3], wherein the extended body portion (41) and the at least one side edge portion (43, 53) are formed in a single conductive plate.

What is claimed is:

1. A busbar structure comprising:
a single conductive metal plate that includes
an electrode connection portion that is comprised of conductive metal and includes a terminal portion in which an electrode contact portion to be brought into contact with one electrode of one adjacent single battery is formed at a tip end of a constricted portion; and
an inter-battery connection portion that includes:
an extended body portion extending from the electrode connection portion; and
at least one side edge portion of a pair of side edge portions extending from both ends of the extended body portion in a width direction perpendicular to an extending direction of the extended body portion,
wherein the at least one side edge portion of the pair of side edge portions is folded onto the extended body portion.

2. The busbar structure according to claim 1, wherein both side edge portions of the pair of side edge portions are folded onto the extended body portion.

3. The busbar structure according to claim 1, further comprising:
an electrode connection plate that is comprised of conductive metal, is conductively connected to an extended tip end of the inter-battery connection portion, and includes a terminal portion in which an electrode contact portion to be brought into contact with another electrode of the one adjacent single battery is formed at a tip end of a constricted portion, wherein the inter-battery connection portion extends with inclination from the electrode connection portion which is connected to the one electrode of each of a plurality of adjacent single batteries toward the electrode connection plate which is connected to the another electrode of each of the plurality of single batteries, the plurality of single batteries being formed in a columnar shape in which axes are directed to the same direction and the one electrodes are directed to the same direction.

4. The busbar structure according to claim 1, wherein
the inter-battery connection portion includes a first fold that connects the at least one side edge portion to the extended portion,
the extended portion includes a case facing surface and a flat surface opposite to the case facing surface,
the at least one side edge portion overlaps the case facing surface.

5. The busbar structure according to claim 4, wherein
both side edge portions of the pair of side edge portions are folded onto the extended body portion, and
each of the pair of side edge portions includes a respective edge, and the respective edges form a mating portion that extends along the case facing surface.

* * * * *